United States Patent
Rosano et al.

(10) Patent No.: US 6,890,983 B2
(45) Date of Patent: May 10, 2005

(54) AQUEOUS COMPOSITE PARTICLE COMPOSITION

(75) Inventors: William Joseph Rosano, Hatboro, PA (US); Gary Robert Larson, Hatfield, PA (US); Leo Joseph Procopio, Lansdale, PA (US); Albert Mulligan Dager, Warrington, PA (US); Gary David Greenblatt, Rydal, PA (US)

(73) Assignee: Rohm and Haas Company, Philadelphia, PA (US)

( * ) Notice: Subject to any disclaimer, the term of this patent is extended or adjusted under 35 U.S.C. 154(b) by 221 days.

(21) Appl. No.: 10/166,928

(22) Filed: Jun. 11, 2002

(65) Prior Publication Data

US 2003/0045627 A1 Mar. 6, 2003

Related U.S. Application Data

(60) Provisional application No. 60/299,701, filed on Jun. 20, 2001.

(51) Int. Cl.$^7$ .............................. C08J 3/00; C08K 3/20; C08K 9/00; C08L 41/00; C08L 43/00
(52) U.S. Cl. ..................... 524/401; 524/497; 524/430; 524/432; 524/433; 524/436; 524/547; 524/556; 523/200
(58) Field of Search ................................ 524/401, 430, 524/432, 433, 436, 547, 556, 497; 523/200, 205

(56) References Cited

U.S. PATENT DOCUMENTS

| | | | |
|---|---|---|---|
| 4,506,057 | A | 3/1985 | Greene et al. |
| 4,733,005 | A | 3/1988 | Schmidt et al. |
| 5,191,029 | A | 3/1993 | DelDonno |
| 5,231,131 | A | 7/1993 | Chu et al. |
| 5,268,197 | A | 12/1993 | Pons et al. |
| 5,319,018 | A | 6/1994 | Owens et al. |
| 5,385,960 | A | 1/1995 | Emmons et al. |
| 6,214,467 | B1 | 4/2001 | Edwards et al. |
| 6,248,826 | B1 | 6/2001 | Solomon et al. |
| 6,376,600 | B1 | 4/2002 | Solomon et al. |
| 6,492,451 | B1 | 12/2002 | Dersch et al. |

FOREIGN PATENT DOCUMENTS

EP  0 221 498 A2  5/1987

*Primary Examiner*—Patrick D. Niland
(74) *Attorney, Agent, or Firm*—Kim R. Jessum; Gary D. Greenblatt

(57) ABSTRACT

An aqueous composite particle composition containing composite particles and polyvalent metal ion is provided. The composite particles contain pigment particle with adsorbed polymer particles. The polymer particles contain pendant acid functional groups and has a molecular weight in a select range. Also provided are methods of preparing the aqueous composite particle composition. The aqueous composite particle composition is useful for preparing coating with high gloss and improved solvent resistance.

9 Claims, No Drawings

AQUEOUS COMPOSITE PARTICLE COMPOSITION

CROSS REFERENCE TO RELATED PATENT APPLICATIONS

This is a non-provisional application of prior now abandoned U.S. provisional application Ser. No. 60/299,701 filed Jun. 20, 2001.

This invention relates to an aqueous composite particle composition containing composite particles and a polyvalent metal ion. In particular, the composite particles include pigment particles with attached polymer particles which have select functional groups and a specified molecular weight range. Also provided are methods of preparing the aqueous composite particle composition. The aqueous composite particle composition is useful for preparing coatings with high gloss and solvent resistance.

Titanium dioxide is the pigment of choice by most coatings manufacturers, particularly paint manufacturers, to provide whiteness and opacity or "hiding" to the final dried coating. Titanium dioxide is typically the most expensive raw material in a coating formulation. Thus, paint manufacturers have long sought to achieve the desired opacity by using the smallest amount of titanium dioxide possible. A number of techniques have been employed, including:

(1) using titanium dioxide that has an optimal average particle size and particle size distribution for light scattering; and
(2) using titanium dioxide that is well dispersed.

The opacifying capability or hiding power of a coating or paint is a function of the spacing of the titanium dioxide particles in the dried coating. The light scattering characteristics of titanium dioxide particles are well known and the average size and size distribution of the titanium dioxide have been optimized by the titanium dioxide manufacturers for maximum scattering. Maximum light scattering occurs when the titanium dioxide pigment particles have a diameter of 200–250 nanometers (nm) and are spaced apart from each other, on the order of a few particle diameters, so that there is minimal interference between the light scattering of neighboring particles.

In an effort to achieve the proper spacing of the pigment particles, titanium dioxide manufacturers have attempted a number of techniques, including encapsulating titanium dioxide particles with a variety of different polymers (either fully in the form of a coating or partially in the form of nodules) or adsorbing a variety of different materials, including polymers (either film forming or non-film forming), to the surface of the titanium dioxide particles. U.S. Pat. No. 5,385,960 discloses an aqueous dispersion of composite particles, the composite particles each including a plurality of selected polymeric latex particles adsorbed to a titanium dioxide particle. The selected polymeric latex particles, which have at least one dihydrogen phosphate functional group, provide spacing between the titanium dioxide particles in films to increase the light scattering of the titanium dioxide particles. Further, this reference discloses that the aqueous dispersion of composite particles may optionally contain biocidal agents such as zinc oxide. Although U.S. Pat. No. 5,385,960 discloses coatings, which contain composite particles, with improved hiding, there is a continuing need to provide these coatings with a combination of a high gloss appearance and improved solvent resistance. The inventors have found an aqueous composition including composite particles containing select polymer particles and also including a polyvalent metal ion, suitable for preparing coatings with high gloss and solvent resistance.

The first aspect of this invention provides an aqueous composite particle composition including a composite particle containing a pigment particle and polymer particles, wherein the polymer particles are attached to the pigment particle, wherein the polymer particles include pendant acid functional groups selected from dihydrogen phosphate functional groups, phosphonate functional groups, sulfonic acid groups, and multiacid polymer functional groups, wherein the weight average molecular weight of the polymer particles is at least 250,000; and at least one polyvalent metal ion.

In the second aspect of this invention, a process is provided for preparing an aqueous composite particle composition containing composite particles and at least one polyvalent metal ion, including the steps of: forming an aqueous dispersion of pigment particles; forming an aqueous dispersion of polymer particles, wherein the polymer particles have pendant acid functional groups selected from dihydrogen phosphate functional group, phosphonate functional groups, sulfonic acid groups, and multiacid polymer functional group, wherein the weight average molecular weight of the polymer particles is at least 250,000; mixing the aqueous dispersion of pigment particles and the aqueous dispersion of polymer particles; and permitting the polymer particles to adsorb onto the pigment particles to provide the composite particles; provided the aqueous composite particle composition contains the at least one polyvalent metal ion.

In the third aspect of this invention, a process is provided for preparing an aqueous composite particle composition, including the steps of forming an aqueous dispersion of polymer particles, wherein the polymer particles have pendant acid functional groups selected from dihydrogen phosphate functional groups, phosphonate functional groups, sulfonic acid groups, and multiacid polymer functional groups, wherein the weight average molecular weight of the polymer particles is at least 250,000; dispersing pigment particles in the aqueous dispersion of polymer particles; and permitting the polymer particles to adsorb onto the pigment particles; provided the aqueous composite particle composition contains the at least one polyvalent metal ion.

The present invention provides an aqueous composition having composite particles, the composite particles each including polymer particles adsorbed to a pigment particle. The polymer particles contains pendant acid functional groups and have a weight average molecular weight of at least 250,000. These polymer particles are useful for providing titanium dioxide containing composites which in combination with polyvalent metal ions, form coatings with high gloss and solvent resistance. The present invention also provides methods of preparing the aqueous composite particle composition.

The aqueous composite particle composition may be used in preparing formulated aqueous compositions, such as coating compositions, paints, and inks, which may be dried to give coatings with high gloss and improved solvent resistance compared to coatings prepared from coating compositions not including the polymer particles of select molecular weight and the polyvalent metal ions. These coatings also have the improved hiding obtained with composite particle containing coatings. In addition, one or more benefits in a variety of coating application properties, including thickener efficiency, slurry compatibility, flow and leveling, color acceptance, color float, syneresis, whiteness, metal marring resistance, corrosion resistance, and water spot resistance may be provided.

As used herein, the term "(meth)acrylate" refers to either acrylate or methacrylate and the term "(meth)acrylic" refers to either acrylic or methacrylic.

"Glass transition temperature" or "$T_g$" as used herein, means the temperature at or above which a glassy polymer will undergo segmental motion of the polymer chain. Glass transition temperatures of a polymer can be estimated by the Fox equation [*Bulletin of the American Physical Society* 1, 3 Page 123 (1956)] as follows:

$$\frac{1}{T_g} = \frac{w_1}{T_{g(1)}} + \frac{w_2}{T_{g(2)}}$$

For a copolymer, $w_1$ and $w_2$ refer to the weight fraction of the two comonomers, and $T_{g(1)}$ and $T_{g(2)}$ refer to the glass transition temperatures of the two corresponding homopolymers in degrees Kelvin. For polymers containing three or more monomers, additional terms are added ($w_n/T_{g(n)}$). The $T_g$ of a polymer can also be calculated by using the appropriate values for the glass transition temperatures of homopolymers, which may be found, for example, in "Polymer Handbook", edited by J. Brandrup and E. H. Immergut, Interscience Publishers. The values of $T_g$ reported herein are calculated using the Fox equation.

The composition of this invention contains at least one composite particle wherein each composite particles includes a pigment particle and polymer particles. The polymer particles useful in the composition of the present invention have a select molecular weight and contain specific pendant acid functional groups including dihydrogen phosphate functional groups, phosphonate functional groups, sulfonic acid groups, and polymeric sidechains containing multiple acid groups, referred to herein as "multiacid polymer functional groups".

The polymer particles may be prepared from a wide range of polymerizable monomers, such as, for example, nonionic ethylenically unsaturated monomers, including α,β-monoethylenically unsaturated monomers such as alkyl acrylates and methacrylates. Suitable nonionic ethylenically unsaturated monomers include styrene, butadiene, α-methyl styrene, vinyl toluene, vinyl naphthalene, ethylene, propylene, vinyl acetate, vinyl versatate, vinyl chloride, vinylidene chloride, acrylonitrile, methacrylonitrile, various $C_1$–$C_{40}$ alkyl esters of (meth)acrylic acid; for example, methyl (meth)acrylate, ethyl (meth)acrylate, n-butyl (meth) acrylate, 2-ethylhexyl (meth)acrylate, cyclohexyl (meth) acrylate, n-octyl (meth)acrylate, n-dodecyl (meth)acrylate, tetradecyl (meth)acrylate, cyclopentyl (meth)acrylate, lauryl (meth)acrylate, oleyl (meth)acrylate, palmityl (meth) acrylate, and stearyl (meth)acrylate; other (meth)acrylates such as isobornyl (meth)acrylate, benzyl (meth)acrylate, phenyl (meth)acrylate, 2-bromoethyl (meth)acrylate, 2-phenylethyl (meth)acrylate, and 1-naphthyl (meth) acrylate, alkoxyalkyl (meth)acrylate, such as ethoxyethyl (meth)acrylate, mono-, di-, trialkyl esters of ethylenically unsaturated di- and tricarboxylic acids and anhydrides, such as ethyl maleate, dimethyl fumarate, and ethyl methyl itaconate. The ethylenically unsaturated monomer may also include at least one multiethylenically unsaturated monomer. Examples of multiethylenically unsaturated monomers that may be used include allyl (meth)acrylate, tripropylene glycol di(meth)acrylate, diethylene glycol di(meth)acrylate, ethylene glycol di(meth)acrylate, 1,6-hexanediol di(meth) acrylate, 1,3-butylene glycol di(meth)acrylate, polyalkylene glycol di(meth)acrylate, diallyl phthalate, trimethylolpropane tri(meth)acrylate, divinylbenzene, divinyltoluene, trivinylbenzene, and divinyl naphthalene.

The pendant acid functional groups may be incorporated into the polymer particle by including as polymerized units, at least one dihydrogen phosphate functional monomer or at least one phosphonate functional monomer. Examples of dihydrogen phosphate functional monomers include dihydrogen phosphate esters of an alcohol in which the alcohol also contains a polymerizable vinyl or olefinic group, such as allyl phosphate, mono- or diphosphate of bis(hydroxymethyl) fumarate or itaconate, derivatives of (meth)acrylic acid esters, such as, for examples phosphates of hydroxyalkyl(meth)acrylates including 2-hydroxyethyl (meth)acrylate, 3-hydroxypropyl (meth)acrylates, and the like. Other suitable monomers are phosphonate functional monomers, disclosed in WO 99/25780 A1; and vinyl phosphonic acid, allyl phosphonic acid, 2-acrylamido-2-methylpropanephosphonic acid, α-phosphonostyrene, 2-methylacrylamido-2-methylpropanephosphonic acid and alkali metal and other salts thereof. Further suitable monomers are 1,2-ethylenically unsaturated (hydroxy) phosphinylalkyl (meth)acrylate monomers, disclosed in U.S. Pat. No. 4,733,005, and include (hydroxy) phosphinylmethyl methacrylate.

Preferred dihydrogen phosphate monomers include:

$CH_2=C(CH_3)CO_2CH_2CH_2OPO(OH)_2$ $CH_2=C(CH_3)CO_2CH_2CH[OPO(OH)_2]CH_3$ $CH_2=C(CH_3)CO_2CH_2CH_2CH_2OPO(OH)_2$ and $CH_2=C(CH_3)CO_2CH_2CHOHCH_2OPO(OH)_2$ and the corresponding acrylates.

The polymer particles may contain dihydrogen phosphate functional monomer or phosphonate functional monomer at levels in the range of 0.1 to 10 weight %, preferably from 0.5 to 5 weight %, and more preferably from 1 to 3 weight %, based on the weight of the polymer particles, as a pendant acid functional group which provides adsorption to the pigment particle.

Alternatively, the polymer particles may be prepared by polymerization and subsequently functionalized to give phosphorus functional groups such as dihydrogen phosphate functional groups. For example, polymer particles containing amine functionality may be reacted under basic conditions with a compound including both epoxy and phosphate functional groups. Similarly, polymer particles containing epoxide functionality may be reacted with a compound including both phosphate and amine groups. The polymer particles which are functionalized to give phosphorus functional groups may contain levels of phosphorus functional groups equivalent to polymer particles prepared from phosphorus functional monomer.

The pendant acid functional groups may be incorporated into the polymer particle by including as polymerized units, at least one sulfonic acid monomer to provide a polymer particle with sulfonic acid groups. Examples of sulfonic acid monomers include vinyl sulfonic acid, methallyl sulfonic acid, styrene sulfonic acid, (meth)acrylate sulfonic acid, acrylamido alkane sulfonic acid, N-(2-sulfol1,1-dimethylethyl)acrylamide, 2-acrylamido-2-methylpropanesulfonic acid, and alkali metal and other salts thereof.

The polymer particles may contain sulfonic acid monomer at levels in the range of 0.1 to 10 weight %, preferably from 0.5 to 5 weight %, and more preferably from 1 to 3 weight %, based on the weight of the polymer particles, as a pendant acid functional group which provides adsorption to the pigment particle.

Pendant acid functional groups also include multiacid polymer functional groups. These groups are polymer sidechains pendant to the polymer formed from the polymerizable monomers. The polymer sidechains are formed from ethylenically unsaturated monomers and contains multiple acid groups which provide adsorption to the pigment particles. The multiacid polymer functional groups may be incorporated into the polymer particle by including as polymerized units, a terminally unsaturated multiacid macromonomer. As used herein, multiacid macromonomer refers to an oligomer with a terminal unsaturation and includes monomers with acid groups as polymerized units. As a polymerized unit in a polymer, the terminal unsaturation and the section of the multiacid macromonomer with the acid groups, may be attached directly or through a linker group. Suitable terminally unsaturated multiacid macromonomers are:

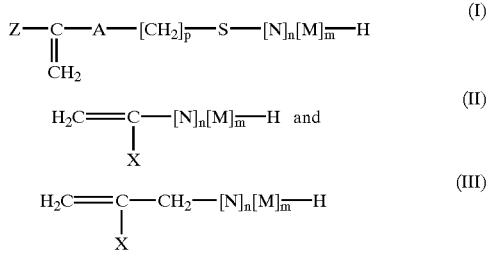

wherein N is the residue of an ethylenically unsaturated carboxylic acid monomer and has the formula:

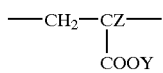

wherein M is the residue of a second ethylenically unsaturated monomer and has the formula

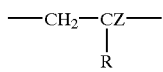

wherein the N and M residues are randomly arranged in the multiacid macromonomer; wherein m is the total number of M residues in the acid macromonomer and is in the range of 0 to 150; wherein n is the total number of N residues in the multiacid macromonomer and is in the range of 2 to 300; wherein n is greater than or equal to m; wherein the sum of n and m is in the range of 2 to 300; wherein A is a linker group selected from the group consisting of ester, urethane, amide, amine, and ether linkages; wherein p is in the range of 1 to 20; wherein X is selected from the group consisting of —COOY and R; wherein R is selected from phenyl radicals, substituted phenyl radicals, —CONH$_2$, —CONHR', —CONR'R', —CN, —CCOR', —OCOR', —Cl, and mixtures thereof, wherein R' is an alkyl or alkoxyalkyl radical independently selected from the group consisting of branched, unbranched, or cyclic hydrocarbon radicals having 1 to 18 carbon atoms; wherein Y is independently selected from the group consisting of H, NH$_4$, alkali metals and alkaline earth metals; and wherein each Z is independently selected from the group consisting of H and CH$_3$.

The multiacid macromonomers may be polymerized from at least one ethylenically unsaturated carboxylic acid monomer and optionally at least one second ethylenically unsaturated monomer. Suitable ethylenically unsaturated carboxylic acid monomers include acrylic acid, methacrylic acid, beta-acryloxypropionic acid, ethacrylic acid, α-chloroacrylic acid, α-vinylacrylic acid, crotonic acid, α-phenylacrylic acid, cinnamic acid, chlorocinnamic acid, and β-styrylacrylic acid. Preferred ethylenically unsaturated carboxylic acid monomers are acrylic acid and methacrylic acid.

The second ethylenically unsaturated monomer includes styrene, vinyltoluene, α-methylstyrene, vinylnaphthalene, vinyl acetate, vinyl versatate, vinyl chloride, (meth)acrylonitrile, (meth)acrylamide, mono-and di-substituted (meth)acrylamide, various ($C_1$–$C_{20}$)alkyl esters of (meth)acrylic acid; for example, methyl (meth)acrylate, ethyl (meth)acrylate, n-butyl (meth)acrylate, isobutyl (meth)acrylate, 2-ethylhexyl (meth)acrylate, cyclohexyl (meth)acrylate, n-octyl (meth)acrylate, n-decyl (meth)acrylate, n-dodecyl (meth)acrylate, tetradecyl (meth)acrylate, n-amyl (meth)acrylate, neopentyl (meth)acrylate, cyclopentyl (meth)acrylate, lauryl (meth)acrylate, oleyl (meth)acrylate, palmityl (meth)acrylate, and stearyl (meth)acrylate; and other (meth)acrylates such as isobornyl (meth)acrylate, benzyl (meth)acrylate, phenyl (meth)acrylate, 2-bromoethyl (meth)acrylate, 2-phenylethyl (meth)acrylate, and 1-naphthyl (meth)acrylate; alkoxyalkyl (meth)acrylate such as ethoxyethyl (meth)acrylate. The multiacid macromonomers contain as polymerized units from 50 to 100 mole percent ethylenically unsaturated carboxylic acid monomer, preferably from 70 to 100 mole percent, and most preferably from 90 to 100 mole percent of these monomers.

The multiacid macromonomers may be prepared by various conventional synthetic methods including anionic polymerization as disclosed in U.S. Pat. No. 4,158,736, radical polymerization with chain transfer agents such as cobalt complexes as described in U.S. Pat. No. 5,324,879, catalytic chain transfer polymerization with terminally unsaturated acid macromonomers used as chain transfer agents as described in U.S. Pat. No. 5,362,826, and high temperature radical polymerization as described in U.S. Pat. No. 5,710,227. The terminally unsaturated multiacid macromonomers of formula I may be prepared by conventional radical polymerization using a hydroxy-functional chain transfer agent such as 2-mercaptoethanol followed by the reaction of the hydroxyl group with an ethylenically unsaturated monomer with a complimentary reactive group to attach the terminal unsaturation. Examples of ethylenically unsaturated monomers with a complimentary reactive group include glycidyl (meth)acrylate, isocyanatoethyl (meth)acrylate, or (meth)acrylic acid. The ethylenically unsaturated monomers with a complimentary reactive group may be attached to the fragment of the hydroxy-functional chain transfer agent by various linkages including ether, urethane, amide, amine, or ester linkages. The multiacid macromonomers of formulas I, II, and III may be prepared by bulk, solution, and emulsion polymerization using batch, semicontinuous, or continuous processes.

Another method to prepare the multiacid macromonomers is polymerization of esters of ethylenically unsaturated carboxylic acid monomers such as ethyl acrylate, butyl acrylate, or methyl methacrylate followed by the partial or complete hydrolysis of the ester groups to obtain the carboxylic acid functionalities.

The polymer particles with multiacid macromonomer may be prepared by polymerization of a mixture of ethylenically unsaturated monomers including multiacid macromonomer. The polymer particles may contain from 0.1 to 20 weight %, preferably from 0.5 to 10 weight %, and more preferably from 1 to 5 weight % multiacid macromonomer, based on the weight of the polymer particles, as a pendant acid functional group which provides adsorption to the pigment particle.

The polymer particles may optionally contain as polymerized units, ionic ethylenically unsaturated monomers such as amide containing monomers such as (meth)acrylamide and carboxylic acid containing monomers including (meth)acrylic acid, itaconic acid, fumaric acid, maleic acid, maleic anhydride, ethacrylic acid α-chloroacrylic acid, α-vinylacrylic acid, crotonic acid, cinnamic acid, chlorocinnamic acid, β-styrylacrylic acid, β-acryloxypropionic acid, and salts thereof. Suitable levels of ionic ethylenically unsaturated monomer may be in the range of 0 to 10 weight %, preferably 0.1 to 5 weight %, and more preferably 0.5 to 4 weight %, based on the dry weight of the polymer particles.

The polymer particles may contain from 0.5 to 300 milliequivalents/gram, preferably 2.5 to 150 milliequivalents/gram, and more preferably 5 to 75 milliequivalents/gram of pendant acid functional groups, based on the dry weight of the polymer particle.

Other types of polymerizable monomers include functional monomers which may be included as polymerized units in the polymer particles useful in the aqueous composite particle composition, depending on the ultimate application for which the product produced by the process of the present invention is intended. For example, small amounts of adhesion-promoting polymerizable monomers can also be included. Examples of other types of functional monomers include hydroxy-functional monomers such as, 2-hydroxyethyl (meth)acrylate, amino-functional monomers, such as glycidyl (meth)acrylate, substituted (meth)acrylamide such as diacetone (meth)acrylamide, acetoacetoxyethyl (meth)acrylate, acrolein, methacrolein, dicyclopentadienyl (meth)acrylate, dimethyl metaisopropenyl benzyl isocyanate, isocyanato ethyl methacrylate, N-vinyl pyrrolidone, N,N'-dimethylamino(meth)acrylate, and polymerizable surfactants, including, but not limited to, Trem™ LF-40 (Trem is a trademark of Henkel Corporation). Methyl cellulose and hydroxyethyl cellulose may be included in the polymerization mixture.

The polymer particle has a glass transition temperature in the range of −50° C. to 100° C., preferably in the range of −10° C. to 80° C., and more preferably in the range of 10° C. to 60° C., as measured by by DSC.

A key aspect of the present invention is the molecular weight of the polymer particles. A high gloss coating may be obtained from a coating composition containing low molecular weight polymer particles. However, the use of low molecular weight polymer particles adversely affects the barrier properties of the coating such as the solvent resistance. The inventors have discovered a critical molecular weight range for the polymer particle which in combination with polyvalent metal ions, provides coatings with both high gloss and solvent resistance. The polymer particles have a weight average molecular weight of at least 250,000, preferably at least 300,000, and more preferably at least 500,000. As used herein, the weight average molecular weight is measure by gel permeation chromatography using tetrahydrofuran solvent. The measurements are based on a polymethylmethacrylate equivalent. The dispersion containing the polymer particles is deionized with Amberlite™ IRN-77 ion exchange resin (Amberlite is a trademark of Rohm and Haas Company) prior to molecular weight measurements.

The polymer particles useful in the aqueous composite particle composition of this invention may be prepared by any process which provides copolymerization of ethylenically unsaturated monomers. Suitable processes include suspension or emulsion polymerization, including for example, the process disclosed in U.S. Pat. Nos. 5,356,968 and U.S. Pat. No. 5,264,530. The polymer particles useful in the composite particle may have monomer compositions, particle sizes, and particle size distributions closely related to polymeric latex binders prepared by standard emulsion polymerization techniques known in the art. In addition, the polymer particles useful in the composite of the invention may have an unimodal or a multimodal, including a bimodal, particle size distribution.

Emulsion polymerization techniques for preparing an aqueous dispersion of the polymer particles from ethylenically unsaturated monomers are well known in the polymer arts, and any conventional emulsion technique for preparing polymer particles such as single stage processes and multiple stage polymerization processes including two stage polymerization processes. The polymer particles may be prepared using a seed polymer emulsion to control the number of particles produced by the emulsion polymerization of the polymer, as is known in the art. The particle size of the polymer particles may be controlled by adjusting the initial surfactant charge as is known in the art. The preparation of polymeric latex polymers such as the polymer particles is discussed generally in D. C. Blackley, *Emulsion Polymerization* (Wiley, N.Y., 1975). The preparation of acrylic latex polymers is described in, for example, *Emulsion Polymerization of Acrylic Polymers,* Bulletin, Rohm and Haas Company, Philadelphia. Preferably, the polymer particles are prepared by a polymerization process in an aqueous medium. Preferably, the aqueous polymerization of the polymer particles containing as polymerized units, ethylenically unsaturated monomers including dihydrogen phosphate functional monomers, phosphonate functional monomer, or multiacid macromonomer is conducted at a pH below 5, more preferably at a pH below 4, and most preferably in a pH range of 1 to 4. In one embodiment, the aqueous polymerization of the polymer particles contain as polymerized units, dihydrogen phosphate functional monomers is conducted in a pH range of 1 to 2.

A polymerization initiator may be used in carrying out the polymerization of the polymer particles. Examples of polymerization initiators which may be employed include polymerization initiators which thermally decompose at the polymerization temperature to generate free radicals. Examples include both water-soluble and water-insoluble species. Examples of free radical-generating initiators which may be used include persulfates, such as ammonium or alkali metal (potassium, sodium, or lithium) persulfate; azo compounds such as 2,2'-azobis(isobutyronitrile), 2,2'-azobis (2,4-dimethylvaleronitrile), and 1-t-butyl azocyanocyclohexane; hydroperoxides such as t-butyl hydroperoxide and cumene hydroperoxide; peroxides such as benzoyl peroxide, caprylyl peroxide, di-t-butyl peroxide, ethyl 3,3'-di-(t-butylperoxy) butyrate, ethyl 3,3'-di(t-amulperoxy) butyrate, t-amylperoxy-2-ethyl hexanoate, and t-butylperoxy pivilate; peresters such as t-butyl peracetate, t-butyl perphthalate, and t-butyl perbenzoate; as well as percarbonates, such as di(1-cyano-1-methylethyl)peroxy dicarbonate; and perphosphates.

Polymerization initiators may be used alone or as the oxidizing component of a redox system, which also includes a reducing component such as ascorbic acid, malic acid, glycolic acid, oxalic acid, lactic acid, thioglycolic acid, or an alkali metal sulfite, more specifically a hydrosulfite, hyposulfite, or metabisulfite, such as sodium hydrosulfite, potassium hyposulfite, and potassium metabisulfite, or sodium formaldehyde sulfoxylate.

The initiator and the optional reducing component may be used in proportions from 0.001% to 5% each, based on the weight of the ethylenically unsaturated monomers in the monomer mixture to be polymerized. Accelerators such as chloride and sulfate salts of cobalt, iron, nickel, or copper may be used in small amounts. Examples of redox catalyst systems include t-butyl hydroperoxide/sodium formaldehyde sulfoxylate/Fe(II), and ammonium persulfate/sodium bisulfite/sodium hydrosulfite/Fe(II). The polymerization temperature may be from room temperature to about 90° C., and may be optimized for the catalyst system employed, as is conventional.

Chain transfer agents may be used to control polymer molecular weight of the polymer particles, if desired. Examples of chain transfer agents include mercaptans, polymercaptans, and polyhalogen compounds. Examples of chain transfer agents which may be used include alkyl mercaptans such as ethyl mercaptan, n-propyl mercaptan, n-butyl mercaptan, isobutyl mercaptan, t-amyl mercaptan, n-hexyl mercaptan, cyclohexyl mercaptan, n-octyl mercaptan, n-decyl mercaptan, n-dodecyl mercaptan; alcohols such as isopropanol, isobutanol, lauryl alcohol, and t-octyl alcohol; halogenated compounds such as carbon tetrachloride, tetrachloroethylene, and trichlorobromoethane. Generally from 0 to 10% by weight, based on the weight of the ethylenically unsaturated monomers in the monomer mixture used to prepare the polymer particles, may be used. The polymer molecular weight may be controlled by other techniques known in the art, such as selecting the ratio of the initiator to ethylenically unsaturated monomer.

Catalyst and/or chain transfer agent may be dissolved or dispersed in separate or the same fluid medium and gradually added to the polymerization vessel. Ethylenically unsaturated monomer, either neat or dissolved or dispersed in a fluid medium, may be added simultaneously with the catalyst and/or the chain transfer agent. Amounts of initiator or catalyst may be added to the polymerization mixture to "chase" residual monomer after polymerization of the polymer particles has been substantially completed to polymerize the residual monomer as is well known in the polymerization arts.

Aggregation of the polymer particles is typically discouraged by including a stabilizing surfactant in the polymerization mixture in the polymerization vessel. In general, the growing polymer particles are stabilized during emulsion polymerization by one or more surfactants such as an anionic or nonionic surfactant, or a mixture thereof, as is well known in the polymerization art. Many examples of surfactants suitable for emulsion polymerization are given in *McCutcheon's Detergents and Emulsifiers* (MC Publishing Co., Glen Rock, N.J.), published annually. Other types of stabilizing agents such as protective colloids, may also be used. However, it is preferred that the amount and type of stabilizing surfactant or other type of stabilizing agent employed during the polymerization reaction be selected so that residual stabilizing agent in the aqueous product of the polymerization reaction does not significantly interfere with the properties of coatings containing the composite of this invention which includes the polymer particles. Further, charged initiator fragments and copolymerized monomer bearing charged functional groups such as copolymerized acid-functional monomer are known to contribute to the stability of the resulting polymer particles. It is important to note that stabilizing surfactants, copolymerized strongly acidic monomers residual initiator fragments, and the like, may also interfere with the aqueous stability of the composites of this invention. Thus adjusting polymerization condition to provide a desired level of residual initiator fragments and surface acid may be very important in providing polymer particles for use in the process of the present invention.

The polymer particles may be prepared as an aqueous dispersion or suspension with a solids level to 70 weight %. The solids level of the polymer particles prepared by aqueous emulsion polymerization is typically in the range of 20 to 70 weight %, preferably in the range of 35 to 60 weight %. Generally, the polymer particles are prepared at the highest possible solids level to maximize the reactor output without undue gel formation either during or after polymerization, and provided the viscosity of the aqueous dispersion or suspension is low enough, to permit pumping and mixing of the aqueous dispersion or suspension.

Composite particles may be prepared with polymer particles having average diameters in the range of 20 nm to 1000 nm, preferably in the range of 30 nm to 500 nm. However, for composite particles containing titanium dioxide pigment or other pigments of similar size, maximum hiding power is typically obtained with polymer particles having average diameters in the range of 40 to 200 nm, preferably in the range of 50 to 150 nm, and more preferably in the range of 60 to 125 nm. The diameter of the polymer particles is measured by a quasielastic light scattering technique, such as provided, for example, by the Model BI-90 Particle Sizer, of Brookhaven Instruments Corp.

Composite particles may be prepared with the polymer particles adsorbed to pigment particles such as zinc oxide pigments, antimony oxide pigments, barium pigments, calcium pigments, zirconium pigments, chromium pigments, iron pigments, magnesium pigments, lead pigments, zinc sulfide, lithopone, and phthalo blue. In one embodiment, the composite particles are prepared from clay particles such as kaolin or delaminated clay particles and particles adsorbed to the clay particles. In another embodiment, the composite particles are prepared from calcium carbonate particles and polymer particles adsorbed to the calcium carbonate particles. Preferably, the pigment particles are titanium dioxide and more preferably, the pigment particles are rutile titanium dioxide. The pigment particles may be uncoated or coated with a conventional pigment coating.

The pigment particle may have an average diameter in the range of 20 nm to 10 $\mu$m, preferably in the range of 50 nm to 500 nm, and more preferably in the range of 100 nm to 300 nm.

The pigment particles are available commercially both in the form of aqueous slurries and as dry pigment, and with a variety of surface treatments, depending on the intended application. Some components of commercially available slurries, such as sodium or ammonium polyelectrolyte dispersants, may inhibit adsorption of the polymer particles on the pigment particles, as may certain surface treatments. Consequently, the extent and strength of adsorption depends on both the grade and physical form of the pigment particle and the identity of the polymer particles employed.

The aqueous composite particle composition also contains a polyvalent metal ion. A polyvalent metal compound may be included in the aqueous composite particle composition to provide the polyvalent metal ion. The polyvalent ion may associate with the pendent acid functional groups to provide crosslinking to the film or coating. The polyvalent ion has an oxidation state of +2 or greater and includes divalent ions, trivalent ions, and tetravalent ions. Suitable ions include $Zn^{+2}$, $Ca^{+2}$, $Mg^{+2}$, $Cu^{+2}$, $Co^{+2}$, $Cr^{+2}$, $Cr^{+3}$, $Fe^{+2}$, $Fe^{+3}$, and $Zr^{+4}$. Preferred ions are $Zn^{+2}$, $Ca^{+2}$, and $Mg^{+2}$. Examples of suitable polyvalent metal compounds include zinc compounds such as zinc oxide, zinc acetate, zinc borate, zinc phosphate, zinc molybdate, zinc halides such as zinc bromate, zinc bromide, and zinc chloride, zinc citrate, zinc lactate, zinc salicylate, zinc sulfate, and zinc sulfite; calcium compounds such as calcium hydroxide, calcium chloride, calcium nitrite, calcium molybdate, and calcium barium phosphosilicate; magnesium compounds such as magnesium oxide, magnesium tetroxide, magnesium sulfate, magnesium chloride, magnesium orthophosphate, magnesium stearate, and magnesium phosphate; zirconium oxide; nickel carbonate; copper sulfate; zinc aluminum phosphate, zinc molybdenum phosphate, zinc phosphate silicate, calcium aluminum phosphates, zinc calcium aluminum strontium phosphate silicate, zinc calcium molybdate, zinc calcium phosphomolybdate, strontium aluminum phosphates, and zinc magnesium phosphate. Other examples of suitable polyvalent metal compounds include polyvalent metal ions complexed with a volatile chelating agent such as, for example, volatile ammonia, amines, $\beta$-ketoesters, $\beta$-diketones, and acryl acetone. Other suitable polyvalent metal compounds include polyvalent metal ions complexed with ligands such as ammonium carbonate complexes of zinc or zirconium, such as Zinplex™ 15 solution (Zinplex is a trademark of Ultra Additives, Corp).

In the aqueous composite particle composition, the ratio of equivalents of metal ion to total equivalents of pendant acid functional groups may be in the range of greater than 0.25 to 3.0, preferably in the range of 0.5 to 2.0, and more preferably in the range of 0.7 to 1.5.

The pH of the aqueous composite particle composition containing the composite particles and the polyvalent metal ion may be in the range of 3 to 10, preferably in the range of 5 to 10, and more preferably in the range of 7 to 10. For application of the aqueous composite particle composition onto a metal substrate, a pH of at least 8 is preferred to minimize corrosion.

An aqueous dispersion including the composite particles of this invention may be prepared by first admixing an aqueous dispersion of pigment particles, an aqueous dispersion of polymer particles, optionally the polyvalent metal ion, and optionally dispersant. Next, the polymer particles are allowed sufficient time to adsorb to the pigment particles to form the composite particles. The adsorption of the polymer particles to the pigment particles is believed to be spontaneous and will continue until the polymer particles are completely adsorbed to the surfaces of the pigment particles, the surfaces of the pigment particles are completely covered with polymer particles, or until an equilibrium is achieved between adsorbed polymer particles and polymer particles remaining dispersed in the aqueous dispersion. The time required for the completion of adsorption may depend upon the pigment type, the surface treatment of the pigment particle, dispersant type and concentration, the concentrations of the pigment particles and the polymer particles, and temperature. The adsorption may be complete upon admixing of the aqueous pigment particle dispersion and the aqueous polymer particle dispersion, or may require further time. For composites prepared with titanium dioxide particles as the pigment particles, adsorption of the polymer particles typically requires 1 to 12 hours for complete adsorption. Mixing the aqueous dispersion of the pigment particles and the aqueous dispersion of the polymer particles may reduce the time for the completion of adsorption. Low levels of other components may be present during the formation of the composite particle provided these components do not substantially inhibit or substantially interfere with the adsorption of the polymer particle to the pigment particle. Examples of other components include cosolvents such as water miscible solvents; wetting agents; defoamers; surfactants; biocides; other copolymers; and other pigments. Preferably the composite particle of this invention is formed in an aqueous medium in the absence of other copolymers.

In the preparation of the composite particles of this invention, the aqueous dispersion of the pigment particles, the aqueous dispersion of the polymer particles, and optionally the dispersant may be admixed by either adding the aqueous pigment particle dispersion to the aqueous polymer particle dispersion or adding the aqueous polymer particle dispersion to the aqueous pigment particle dispersion. The optional dispersant may be added to the aqueous pigment particle dispersion, the aqueous polymer particle dispersion, or to the mixture of the aqueous pigment particle dispersion and the aqueous polymer particle dispersion. Mixing may be provided to ensure that the pigment particles and polymer particles are distributed uniformly in the combined aqueous medium. It is preferred that the aqueous pigment particle dispersion is added to the aqueous polymer particle dispersion, rather than visa versa, so that situations in which there is a temporary "excess" of pigment particles relative to the polymer particles, and the possibility of grit formation through bridging flocculation of the polymer particles by the excess of pigment particles, may be avoided.

An aqueous dispersion including the composite particles of this invention may also be prepared by first forming an aqueous dispersion of polymer particles. Next, the pigment particles are dispersed in the aqueous dispersion of polymer particles and optionally dispersant, and the polymer particles are allowed to adsorb onto the pigment particles to form the composite particles.

A polyvalent metal compound may be added to provide the polyvalent metal ion at any step in the process to prepare the composite particles. For example, a polyvalent metal compound may be included in the aqueous dispersion of the pigment particles or alternatively, may be included in the aqueous dispersion of the polymer particles. A polyvalent metal compound may also be added to a mixture containing the pigment particles and the polymer particles in which the polymer particles have not fully adsorbed onto the pigment particles or may be added to an aqueous medium containing the composite particles.

The preparation of the composite particle of this invention includes an optional dispersant. The dispersant may be added at levels that do not inhibit or prevent the adsorption of the polymer particle to the pigment particle. The composite particle may be prepared with levels of dispersant in the range of 0 to 5 weight %, preferably 0 to 3 weight %, and more preferably 0 to 2 weight %, based on the dry weight of the pigment particles. In one embodiment, the first aqueous medium is prepared with dispersant to aid in the dispersion and stabilization of the pigment particles. In another embodiment, the composition containing the composite particle of this invention does not contain dispersant. Suitable dispersants include anionic polyelectrolyte dispersants such as copolymerized maleic acid, copolymers including copolymerized acrylic acid, copolymers including copolymerized methacrylic acid, and the like; or carboxylic acids containing molecules such as tartaric acid, succinic acid, or citric acid.

The practice of the process of the present invention may depend on the specific grade of pigment employed, such as a specific grade of a pigment particle. The present process may be employed to yield improved coating properties with respect to a specific grade of a pigment particle, such as titanium dioxide, may be readily determined empirically. Electron microscopy may be employed to observe the composite particle of this invention formed by admixing the first aqueous medium, the second aqueous medium, and optionally, dispersant. Composite particle formation may also be characterized gravimetrically as described in U.S. Pat. No. 6,080,802.

In addition to the composite particles, other components may be added to the composition of this invention depending upon the application of the composition. For example, a second polymer may be included as a binder in a composition suitable as a coating formulation for coating substrates. As used herein, a second polymer refers to polymers which are film forming at application conditions. Suitable second polymers include polymer particles with minimum film formation temperatures at or below the application temperature. Other suitable second polymers include polymer particles with minimum film formation temperatures above the application temperature which may also include coalescents or plasticizers to provide the polymer particles with effective minimum film formation temperatures at or below the application temperature. Other suitable second polymers include water soluble polymers such as acrylic copolymers. Compositions including the composite particle of this invention which are suitable as coating compositions may contain from 0 to 30 weight % second polymer, based on the weight of the composition solids.

In one embodiment of the present invention, the polymer particles are preferably polymer particles polymerized from one or more monomers which provide polymer which is hard or rigid at the temperature at which the aqueous composite particle composition is to be used, such as monomers which provided a polymeric material with a glass transition temperature of at least 20° C., more preferably at least about 35° C., and even more preferably at least 50° C. in the case of an aqueous composite particle composition applied at ambient or room temperature (that is, at about 20–23° C.). Higher glass temperature ranges may be more appropriate for applications at higher temperatures, such as baked coatings.

In a second embodiment of the present invention, the process of this invention contemplates preparing a mixture of at least two types of polymer particles, the first type being the polymer particles containing the pendant acid functional groups, and preferably having an effective glass transition temperature of at least 20° C., more preferably at least 35° C., and even more preferably at least 50° C. The second type of polymer particle is provided to form a binder for the composite particles. The mixture can be used to prepare formulated compositions, such as coating compositions, which show improved opacity and solvent resistance.

In the third embodiment of the present invention, the polymer particle has a relatively low effective glass transition temperature, that is, from −50° C. to 30° C., and serves as a binder for the aqueous composite particle composition.

In yet another embodiment, two or more types of soft polymer particles are employed as binders, one or more of these being the polymer particles containing the pendant acid functional group.

In addition, the composition containing the composite particles of this invention may also include other optional components, including without limitation, other polymers, surfactants, extenders, pigments, and dyes, pearlescents, adhesion promoters, dispersants, defoamers, leveling agents, optical brighteners, UV stabilizers, coalescents, rheology modifiers, preservatives, biocides, and antioxidants. Further, the composition containing the composite particles may also include other pigments, including plastic pigments such as solid bead pigments and microsphere pigments containing voids or vesicles, and inorganic pigments. Examples of solid bead pigments include polystyrene and polyvinyl chloride beads. Examples of microsphere pigments, which include polymer particles containing one or more voids and vesiculated polymer particles, are disclosed in U.S. Pat. No. 4,427,835; U.S. Pat. No. 4,920,160; U.S. Pat. No. 4,594,363; U.S. Pat. No. 4,469,825; U.S. Pat. No. 4,468,498; U.S. Pat. No. 4,880,842; U.S. Pat. No. 4,985,064; U.S. Pat. No. 5,157,084; U.S. Pat. No. 5,041,464; U.S. Pat. No. 5,036,109; U.S. Pat. No. 5,409,776, and U.S. Pat. No. 5,510,422. The levels of composite particles and plastic pigments in the composition may be varied to optimize a particular property in the dried coating, such as hiding, whiteness, gloss, or any combination of properties.

The aqueous composite particle composition of this invention is particularly useful for improving the performance of coatings and paints formed therefrom. Alternatively, the invention offers the ability to formulate coatings and films of substantially equal performance properties as conventional systems but with lower concentrations of expensive titanium dioxide pigment, and accordingly, lower cost. The present invention further contemplates preparing fully formulated aqueous compositions, including aqueous coating compositions, using the aqueous composite particle composition to form products, including coatings and coated articles.

The processes of the present invention are believed to be dependent to some extent on the relative concentrations and particle sizes of the polymer particles and the pigment particles with more polymer particles being required at a higher concentration of pigment particle for optimum performance. Preferably, the polymer particles are employed at sufficient levels to obtain optimum performance properties in formulations prepared for particular applications.

The concentration of pigment particles including extenders which may be present in the coating formulation is expressed in terms of the pigment volume concentration of the formulation. The pigment volume concentration (hereinafter referred to as the "PVC") of a formulation is defined as the volume amount of inorganic particles, including titanium dioxide and other pigment particles as well as extender particles, present in the formulation, divided by the sum of the volume amount of such inorganic particles plus polymer particle solids in the formulation and expressed herein as a percentage. Coatings with high gloss and solvent resistance may be obtained from aqueous composite particle compositions formulated over any PVC range. Preferably, the PVC of coating formulations including the aqueous composite particle composition of the present invention is from 5% to 85%, and more preferably from 10% to 60%.

The aqueous composite particle composition may be used in or as architectural coatings such as interior and exterior house paints, including masonry paints, wood coatings, and treatments; floor polishes; maintenance coatings such as metal coatings; paper coatings; and traffic paints such as those paints used to mark roads, pavements, and runways. Other uses include binders for nonwovens and textiles, electronic chemicals, powder coatings, leather treatments, adhesives, caulks, and elastomeric wall mastics.

An article may be prepared containing the aqueous composite particle composition as a dried material. The article may be prepared by applying the aqueous composite particle composition onto the article; and drying or allowing to dry the aqueous composite particle composition. Methods of application include conventional application methods such as, for example, brushing; roll coating; doctor-blade application; printing methods; spraying methods such as airatomized spray, air-assisted spray, airless spray, high volume low pressure spray, and air-assisted airless spray; and dipping. The aqueous composite particle composition may be allowed to dry at ambient conditions or dried by the application of heat, such as, for example, infrared driers or placed in an oven.

The illustrative examples which follow illustrate the composition and the process of the present invention. These examples will aid those skilled in the art in understanding the present invention; however, the present invention is in no way limited thereby.

EXAMPLE 1

Preparation of Aqueous Dispersion Containing Polymer Particles

A monomer emulsion was prepared by combining 400 g of deionized (DI) water, 46.2 g of an ethoxylated $C_6$ to $C_{18}$ alkyl ether sulfate containing 1 to 40 ethylene oxide groups per molecule (30 weight % active), 731.4 g ethylhexyl acrylate (EHA), 337.6 g acrylonitrile (AN), 555.7 g styrene (ST'Y), 47.1 g of phosphoethyl methacrylate (PEM). A five liter 4-neck round bottom, flask containing an initial charge of 1275 g DI water and 2.6 g ethoxylated $C_6$ to $C_{18}$ alkyl ether sulfate having 1 to 40 ethylene oxide groups per molecule (30 weight % active), followed by a rinse of 4.3 g of DI water was heated to 89° C. under nitrogen sweep. A 114.8 g aliquot of the monomer emulsion was added to the flask followed by a rinse of 30 g of DI water and 4.2 g ammonium persulfate dissolved in 43.3 g of DI water. After stirring for 6 minutes, the remaining monomer emulsion and a solution of 2.8 g ammonium persulfate in 100 g DI water were added separately to the flask over 1.5 hours. The temperature of the batch in the kettle was maintained at 89° C. during the addition. When all additions were completed, the containers were rinsed with 46.6 g of DI water which was added to the reaction flask. A catalyst/activator pair was added after the monomer emulsion feed was completed. The final polymer was neutralized with aqueous ammonia (29 % active).

The polymer particles of Example 1 had a composition of 42.25 EHA/19.5 AN/33.55 STY/1.9 MMA/ 2.8 PEM, based on weight %, as polymerized units and an average particle diameter of 115 nm. The polymer of Example 1 had a weight average molecular weight of 529,000, a number average molecular weight of 42,000, and a calculated glass transition temperature of –9.8° C. The aqueous polymer dispersion of Example 1 contained 43 weight % solids and had a pH of 8.5.

Comparative A—Preparation of Aqueous Polymer Dispersion

The aqueous polymer dispersion of Comparative A was prepared according to the process of Example 1 except that the monomer emulsion also contained 2.1 g n-dodecyl mercaptan (nDDM).

The polymer particles of Comparative A had a composition of 42.25 EHA/19.5 AN/33.55 STY/1.9 MMA/2.8 PEM/ 0.12 n-DDM, based on weight as polymerized units and an average particle diameter of 115 nm. The polymer of Comparative A had a weight average molecular weight of 195, 000, a number average molecular weight of 42,500, and a calculated glass transition temperature of –9.8° C. The aqueous polymer dispersion of Comparative A contained 43 weight % solids and had a pH of 8.5.

Comparative B—Preparation of Aqueous Polymer Dispersion

A monomer emulsion was prepared by combining 501.6 g of DI water, 25 g of polyethylene glycol-6 tridecyl ether phosphate surfactant (25 weight % active), 774.9 g of ethylhexyl acrylate, 489.4 g of styrene, 337.4 g of acrylonitrile, 60.8 g of methacrylic acid, and 41.9 g of methyl methacrylate. A five liter 4-neck round bottom flask containing an initial charge of 1220 g of DI water and 42.4 g of PEG-6 tridecyl ether phosphate surfactant (25 weight % active), followed by a rinse of 22.2 g of DI water was heated to 89° C. under nitrogen sweep. A 114.7 g aliquot of the monomer emulsion was added to the flask followed by a rinse of 28.9 g of DI water. After stirring for 6 minutes, the remaining monomer emulsion and a solution of 2.2 g of ammonium persulfate, 16.5 g of an ammonium acetate solution (65.1% active) and 214.8 g of DI water were added separately to the flask over 1.5 hours. The temperature of the batch in the kettle was maintained at 89° C. during the addition. When all additions were completed, the containers were rinsed with 12.3 g of DI water which was added to the reaction flask. A catalyst/activator pair was added after the emulsion feed was completed. The final polymer was neutralized with aqueous ammonia (29% active).

The polymer particles of Comparative B had a composition of 42.76 EHA/19.5 AN/31.82 STY/2.42 MMA/3.5 MAA, based on weight %, as polymerized units and an average particle diameter of 110 nm. The polymer of Comparative B had a weight average molecular weight of 603, 000, a number average molecular weight of 57,000, and a calculated glass transition temperature of –9.6° C. The aqueous polymer dispersion of Comparative B contained 42 weight % solids and had a pH of 8.6.

EXAMPLE 2

Preparation of Aqueous Composite Particle Compositions and Comparative Composite Particle Compositions An aqueous titanium dioxide dispersion was prepared from the materials listed in Table 2.1. The materials were mixed under high shear to form an aqueous titanium dioxide dispersion

TABLE 2.1

Materials for Preparing Aqueous Titanium Dioxide Dispersion

| Material | Weight |
|---|---|
| Water | 40.02 g |
| Dowanol ™ DPM coalescent | 20.01 g |
| Tamol ™ 681M dispersant | 9.01 g |
| Drewplus ™ L-493 defoamer | 1.00 g |
| Triton ® CF-10 surfactant | 2.00 g |
| Ammonia (28%) | 1.00 g |
| Zinc oxide | 2.00 g |
| Ti-Pure ™ R-706 titanium dioxide | 208.16 g |
| Total Weight | 283.21 g |

Dowanol is a trademark of Dow Chemical Company; Tamol is a trademark of Rohm and Haas Company; Drewplus is a trademark of Drew Industrial Div., Ashland Chemical Industries; Triton is a trademark of Union Carbide;
Ti-Pure is a trademark of E.I. DuPont DeNemours Co.

The aqueous composite particle composition was prepared by combining the materials listed in Table 2.2. First, the polymer dispersion of Example 1, water, and ammonia were mixed together. Then the aqueous titanium dioxide dispersion was slowly added to the dilute polymer dispersion mixture with mixing, followed by the addition of the Texanol™ coalescent, sodium nitrite and the rheology modifier with further mixing. A period of 24 hours was allowed for the polymer particles to adsorb onto the titanium dioxide particles to form the composite particles.

TABLE 2.2

Materials for Preparing Aqueous Composite Particle Composition of Example 2.1

| Material | Weight |
| --- | --- |
| Example 1 | 590.51 g |
| Water | 68.61 g |
| Ammonia (28%) | 10.01 g |
| Aqueous titanium dioxide dispersion | 283.21 g |
| Texanol ™ coalescent | 38.53 g |
| Sodium nitrate | 9.01 g |
| Acrysol ™ RM-8W rheology modifier | 3.00 g |

Texanol is a trademark of Eastman Chemical Co.; and Acrysol is a trademark of Rohm and Haas Company.

The aqueous composite particle composition of Example 2.1 had a solids level of 53 weight %, a pH of 9.5, and a zinc oxide level of 0.2 weight % based on the weight of the aqueous composite particle composition. The composite particles contained 36 weight % of the available polymer particles of Example 1.

The aqueous composite particle composition of Example 2.2 was prepared according to the procedure for Example 2.1 except that the amount of zinc oxide was increased to provide a zinc oxide level of 1.0 weight % based on the weight of the aqueous composite particle composition A comparative composite particle composition, Comparative E, was prepared based on the procedure for Example 2.1 except zinc oxide was not added.

Comparative composite particle compositions were prepared according to the procedure used for preparing Example 2.1 by substituting the aqueous polymer dispersions of Comparative A and Comparative B for the dispersion of Example 1.

The composite particle composition of Comparative C1 contained composite particles formed from the aqueous polymer dispersion of Comparative A, did not contain zinc oxide, had a solids level of 53 weight %, and a pH of 9.5. The composite particles contained 35 weight % of the available polymer particles of Comparative A. Comparative C2 was also prepared from the aqueous polymer dispersion of Comparative A and had a zinc oxide level of 0.2 weight % based on the weight of the aqueous composite particle composition.

The composite particle composition of Comparative D1 contained composite particles formed from the aqueous polymer dispersion of Comparative B, did not contain zinc oxide, had a solids level of 53 weight %, and a pH of 9.5. The composite particles contained 3 weight % of the available polymer particles of Comparative B. Comparative D2 was also prepared from the aqueous polymer dispersion of Comparative B and had a zinc oxide level of 1.0 weight % based on the weight of the aqueous composite particle composition.

TABLE 2.3

Aqueous Composite Particle Compositions and Comparative Compositions

| Sample ZnO | Aq. Composite Particle Comp. | Wt. % |
| --- | --- | --- |
| Comparative E | Example 1 | 0 |
| Example 2.1 | Example 1 | 0.2 |
| Example 2.2 | Example 1 | 1.0 |

TABLE 2.3-continued

Aqueous Composite Particle Compositions and Comparative Compositions

| Sample ZnO | Aq. Composite Particle Comp. | Wt. % |
| --- | --- | --- |
| Comparative C1 | Comparative A | 0 |
| Comparative C2 | Comparative A | 0.2 |
| Comparative D1 | Comparative B | 0 |
| Comparative D2 | Comparative B | 1.0 |

EXAMPLE 3

Evaluation of Aqueous Composite Particle Composition

The aqueous composite particle compositions and the comparative compositions were applied to treated cold rolled steel panels with a wet film thickness of 254 μm (10 mils), in accordance with ASTM D-823-95 procedure E, to give a dry film thickness of about 50 μm (2 mils). The steel panels were B1000 panels from ACT Labs, 273 Industrial Drive, Hillside, Mich. The coated steel panels were dried for 14 days prior to testing.

The gloss values of the dried coated samples were measured by ASTM D-523=89 (re-approved 1999) test method. High gloss values were at least 35 for 20° gloss and 70 for 60° gloss.

The solvent resistance was measured by using ASTM D5402-93 (Assessing the Solvent Resistance of Organic Coatings Using Solvent Rubs). The test was conducted using a Crockmeter described in ASTM standard test method F-1319-94 and methyl ethyl ketone as the solvent. An acceptable level of solvent resistance was at least 200 repetitions.

TABLE 3.1

Properties of Coatings Prepared from Aqueous Composite Particle Composition and Comparative Compositions

| Composition | Gloss (20°/60°) | Solvent resistance |
| --- | --- | --- |
| Comparative E | 58/33 | 49–51 |
| Example 2.1 | 54/80 | >500 |
| Example 2.2 | 46/76 | 313–464 |
| Comparative C1 | 58/83 | <20 |
| Comparative C2 | 54/81 | 17 |
| Comparative D1 | 3/39 | 95 |
| Comparative D2 | 15/56 | 325 |

The results in Table 3.1 show that the aqueous composite particle composition of this invention, as exemplified by Example 2.1 and Example 2.2, provided coatings with a combination of high gloss and acceptable solvent resistance. In contrast, coatings prepared from Comparative E, Comparative C1, or Comparative C1, which did not contain a polyvalent metal ion, had unacceptable levels of solvent resistance. Further, coatings prepared from Comparative C2, which had composite particles containing polymer particles with a weight average molecular weight less than 250,000, did not provide acceptable levels of solvent resistance. The coating prepared from Comparative D2, which had polymer particles which did not contain pendant acid functional groups, had acceptable solvent resistance but did not have high gloss. The results show that coatings prepared from the aqueous composite particle composition of this invention, which included composite particles containing polymer particles with specific pendant acid functional groups and having a select weight average molecular weight range, had high gloss and acceptable solvent resistance.

EXAMPLE 4

Aqueous Composite Particle Composition and Comparative Composite Particle Composition Containing Soluble Zinc Complex Aqueous composite particle compositions were prepared according to the procedure for the preparation of Example 2.1 except that a soluble zinc complex was added as to provide the polyvalent metal ion, instead of zinc oxide. The soluble zinc complex was Zinplex™ 15 solution. Comparative composite particle compositions were also prepared using the aqueous polymer particle dispersion of Comparative B and the soluble zinc complex.

TABLE 4.1

Aqueous Composite Particle Compositions and Comparative Compositions Containing Soluble Zinc Complex

| Sample $Zn^{+2}$ | Aq. Composite Particle Comp. | Equivalents |
|---|---|---|
| Comparative E1 | Example 1 | 0 |
| Comparative E2 | Example 1 | 0.25 |
| Example 4.1 | Example 1 | 0.50 |
| Example 4.2 | Example 1 | 1.00 |
| Example 4.3 | Example 1 | 2.00 |
| Comparative D1 | Comparative B | 0 |
| Comparative F1 | Comparative B | 0.25 |
| Comparative F2 | Comparative B | 0.50 |
| Comparative F3 | Comparative B | 1.00 |
| Comparative F4 | Comparative B | 2.00 |

Coated samples were prepared from the aqueous composite particle compositions and the comparative compositions and tested as described in Example 3.

TABLE 4.2

Properties of Coatings Prepared from Aqueous Composite Particle Composition and Comparative Compositions Containing Soluble Zinc Complex

| Composition | Gloss (20°/60°) | Solvent Resistance |
|---|---|---|
| Comparative E1 | 59/83 | 42 |
| Comparative E2 | 60/82 | 52 |
| Example 4.1 | 60/83 | 203 |
| Example 4.2 | 53/79 | >300 |
| Example 4.3 | 41/72 | >300 |
| Comparative D1 | 10/52 | 96 |
| Comparative F1 | 13/54 | 102 |
| Comparative F2 | 11/53 | 123 |
| Comparative F3 | 14/58 | 295 |
| Comparative F4 | 32/68 | >300 |

The results in Table 4.2 show that the aqueous composite particle composition of this invention containing soluble zinc complex, as exemplified by Examples 4.1, Example 4.2, and Example 4.3, provided coatings with a combination of high gloss and acceptable solvent resistance. In contrast, coatings prepared with 0.25 equivalents or less of $Zn^{+2}$ had unacceptable solvent resistance. Further, the comparative composite particle compositions, Comparative F1, Comparative F2, Comparative F3, and Comparative F4, which contained composite particles prepared from polymer particles in which carboxylic acid groups were substituted for the specific pendant acid functional groups, did not provide coatings with high gloss.

We claim:

1. An aqueous composite particle composition comprising:
    a) a composite particle comprising:
        i) a pigment particle and
        ii) polymer particles;
        wherein said polymer particles are attached to said pigment particle;
        wherein said polymer particles comprise pendant acid functional groups selected from the group consisting of dihydrogen phosphate functional groups, phosphonate functional groups, sulfonic acid groups, and multiacid polymer functional groups;
        wherein the weight average molecular weight of said polymer particles is at least 250,000; and
    b) at least one polyvalent metal ion selected from the group consisting of $Zn^{+2}$, $Cu^{+2}$, $Co^{+2}$, $Cr^{+2}$, $Cr^{+3}$, $Fe^{+2}$, $Fe^{+3}$, and $Zr^{+4}$.

2. The aqueous composite particle composition according to claim 1 wherein the ratio of equivalents of said polyvalent metal ion to total equivalents of said pendant acid functional groups is in the range of greater than 0.25 to 2.0.

3. The aqueous composite particle composition according to claim 1 wherein said pigment particle is titanium dioxide.

4. The aqueous composite particle composition according to claim 1 wherein the weight ratio of said pigment particle to said polymer particles is in the range of 2:1 to 1:30.

5. The aqueous composite particle composition according to claim 1 wherein said polymer particles comprise as polymerized units, based on the weight of said polymer particles:
    a) from 85 to 99.9 weight % nonionic ethylenically unsaturated monomer;
    b) from 0 to 5 weight % ionic ethylenically unsaturated monomer; and
    c) from 0.1 to 10 weight % dihydrogen phosphate functional monomer.

6. The aqueous composite particle composition according to claim 1 wherein said polymer particles comprise as polymerized units, based on the weight of said polymer particles:
    a) from 75 to 99.9 weight % nonionic ethylenically unsaturated monomer;
    b) from 0 to 5 weight % ionic ethylenically unsaturated monomer; and
    c) from 0.1 to 20 weight % terminally unsaturated multiacid macromonomer.

7. The aqueous composite particle composition according to claim 1 wherein said polymer particles have an average particle diameter in the range of 20 nm to 300 nm.

8. A process for preparing an aqueous composite particle composition comprising composite particles and at least one polyvalent metal ion, comprising the steps of:
    a) forming an aqueous dispersion of pigment particles;
    b) forming an aqueous dispersion of polymer particles, wherein said polymer particles comprise pendant acid functional groups selected from the group consisting of dihydrogen phosphate functional group, phosphonate functional groups, sulfonic acid groups, and multiacid polymer functional group, wherein the weight average molecular weight of said polymer particles is at least 250,000;
    c) mixing said aqueous dispersion of pigment particles and said aqueous dispersion of polymer particles; and
    d) permitting said polymer particles to adsorb onto said pigment particles to provide said composite particles;

provided said aqueous composite particle composition comprises said at least one polyvalent metal ion selected from the group consisting of $Zn^{+2}$, $Cu^{+2}$, $Co^{+2}$, $Cr^{+2}$, $Cr^{+3}$, $Fe^{+2}$, $Fe^{+3}$, and $Zr^{+4}$.

9. A process for preparing an aqueous composite particle composition, comprising the steps of:

a) forming an aqueous dispersion of polymer particles, wherein said polymer particles comprise pendant acid functional groups selected from the group consisting of dihydrogen phosphate functional groups, phosphonate functional groups, sulfonic acid groups, and multiacid polymer functional groups, wherein the weight average molecular weight of said polymer particles is at least 250,000;

b) dispersing pigment particles in said aqueous dispersion of polymer particles; and c) permitting said polymer particles to adsorb onto said pigment particles; provided said aqueous composite particle composition comprises said at least one polyvalent metal ion selected from the group consisting of $Zn^{+2}$, $Cu^{+2}$, $Co^{+2}$, $Cr^{+2}$, $Cr^{+3}$, $Fe^{+2}$, $Fe^{+3}$, and $Zr^{+4}$.

* * * * *